(12) United States Patent
Ouchi

(10) Patent No.: US 10,205,922 B2
(45) Date of Patent: *Feb. 12, 2019

(54) DISPLAY CONTROL APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Akihiro Ouchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/802,973

(22) Filed: Nov. 3, 2017

(65) Prior Publication Data

US 2018/0054602 A1 Feb. 22, 2018

Related U.S. Application Data

(63) Continuation of application No. 14/923,657, filed on Oct. 27, 2015, now Pat. No. 9,838,656.

(30) Foreign Application Priority Data

Oct. 30, 2014 (JP) ................................ 2014-221961

(51) Int. Cl.
*H04N 9/31* (2006.01)
*G06T 5/50* (2006.01)
*G06T 5/00* (2006.01)

(52) U.S. Cl.
CPC ............ *H04N 9/3185* (2013.01); *G06T 5/006* (2013.01); *G06T 5/50* (2013.01); *H04N 9/3194* (2013.01);

(Continued)

(58) Field of Classification Search
CPC ...... H04N 9/3185; H04N 9/3194; H04N 9/31; H04N 9/3147; H04N 5/3696;

(Continued)

(56) References Cited

U.S. PATENT DOCUMENTS 6,392,701 B1 5/2002 Akeyama et al.
6,416,186 B1 7/2002 Nakamura
(Continued)

FOREIGN PATENT DOCUMENTS

JP 2001-051346 A 2/2001
JP 2005094599 A 4/2005
(Continued)

OTHER PUBLICATIONS

Japanese Office Action issued in Appl. No. JP 2014-221961 dated Jul. 30, 2018, together with English language translation (11 pages).

*Primary Examiner* — Paulos M Natnael
(74) *Attorney, Agent, or Firm* — Carter, DeLuca, Farrell & Schmidt, LLP

(57) ABSTRACT

A display control apparatus which projects and displays at least one image on a screen, converts a frame frequency for a display of the at least one image to N times (N>1), generates an added image by adding a predetermined pattern to the converted frame and a subtracted image by subtracting the predetermined pattern from the converted frame as a first frame and a second frame following the first frame, projects the generated first frame and the second frame for an image on the screen at the N-times frequency, acquires the image projected on the screen, extracts the pattern from the acquired image, and corrects a shape of the image based on the extracted pattern.

19 Claims, 11 Drawing Sheets

(52) U.S. Cl.
CPC ............... *G06T 2207/10016* (2013.01); *G06T 2207/20224* (2013.01)

(58) Field of Classification Search
CPC ............. H04N 5/7475; H04N 13/0048; H04N 13/025; H04N 7/01; H04N 1/648; G06T 5/50; G06T 5/006; G06T 2207/20224; G06T 2207/10016; G03B 33/10
USPC ........ 348/744–745, 746, 714–715, 719, 669, 348/670, 524, 430.1, 437.1, 457, 470, 348/490, 333.1, 354, 370, 231.99, 251, 348/14.14, 49, 50, 64, 73, 135, 137, 142, 348/169, 174; 356/391, 603, 610; 353/121; 382/181, 191
See application file for complete search history.

(56) References Cited

U.S. PATENT DOCUMENTS

| | | | |
|---|---|---|---|
| 6,529,600 B1 | 3/2003 | Epstein et al. | |
| 6,757,441 B1* | 6/2004 | Katayama | G06T 9/007 382/248 |
| 7,907,795 B2 | 3/2011 | Hardy et al. | |
| 8,547,398 B2 | 10/2013 | Ouchi | |
| 9,092,879 B2 | 7/2015 | Ouchi | |
| 9,838,656 B2* | 12/2017 | Ouchi | H04N 9/3185 |
| 2002/0196264 A1 | 12/2002 | Goetz | |
| 2004/0230421 A1 | 11/2004 | Cezanne et al. | |
| 2005/0110959 A1* | 5/2005 | Miyazawa | G03B 21/10 353/94 |
| 2005/0146644 A1* | 7/2005 | Miyazawa | H04N 5/74 348/745 |
| 2006/0139492 A1* | 6/2006 | Ahn | G09G 5/005 348/558 |
| 2006/0159368 A1* | 7/2006 | Kondo | G06T 1/00 382/299 |
| 2007/0115440 A1 | 5/2007 | Wiklof | |
| 2007/0274588 A1 | 11/2007 | Jeong et al. | |
| 2007/0279494 A1 | 12/2007 | Aman et al. | |
| 2007/0291110 A1* | 12/2007 | Era | H04N 13/026 348/42 |
| 2009/0040532 A1 | 2/2009 | Kawasaki et al. | |
| 2009/0097835 A1* | 4/2009 | Kunishige | G03B 9/70 396/56 |
| 2009/0324016 A1* | 12/2009 | Ikeda | G01S 3/7864 382/103 |
| 2010/0002197 A1 | 1/2010 | Kaneko | |
| 2010/0155478 A1 | 6/2010 | Ogasawara et al. | |
| 2011/0110602 A1 | 5/2011 | Hiraki et al. | |
| 2011/0128461 A1 | 6/2011 | Koyama et al. | |
| 2011/0134158 A1 | 6/2011 | Onishi | |
| 2011/0142290 A1 | 6/2011 | Aida et al. | |
| 2011/0216236 A1 | 9/2011 | Kasahara et al. | |
| 2012/0008829 A1 | 1/2012 | Hao et al. | |
| 2012/0013601 A1* | 1/2012 | Park | G02B 27/2264 345/419 |
| 2012/0105642 A1* | 5/2012 | Nojiri | B60R 1/00 348/148 |
| 2012/0140189 A1 | 6/2012 | Hiranuma et al. | |
| 2012/0212597 A1 | 8/2012 | Hanna | |
| 2012/0314951 A1 | 12/2012 | Okabe | |
| 2013/0093805 A1 | 4/2013 | Iversen | |
| 2013/0121605 A1 | 5/2013 | Imada et al. | |
| 2013/0176460 A1 | 7/2013 | Nakashima | |
| 2013/0176488 A1 | 7/2013 | Nakashima | |
| 2013/0201403 A1* | 8/2013 | Iversen | G06T 3/0093 348/659 |
| 2013/0222776 A1 | 8/2013 | Ishikawa | |
| 2013/0314380 A1* | 11/2013 | Kuribayashi | G06F 3/0425 345/175 |
| 2013/0321672 A1 | 12/2013 | Silverstein et al. | |
| 2013/0329093 A1 | 12/2013 | Zhang et al. | |
| 2013/0342816 A1* | 12/2013 | Furui | G03B 21/147 353/69 |
| 2014/0009628 A1 | 1/2014 | Jang et al. | |
| 2014/0168257 A1 | 6/2014 | Liu | |
| 2014/0241645 A1* | 8/2014 | Esaki | G06T 5/001 382/263 |
| 2014/0340529 A1 | 11/2014 | Shibata et al. | |
| 2015/0049185 A1 | 2/2015 | Bae et al. | |
| 2015/0091446 A1 | 4/2015 | Ohta et al. | |
| 2015/0229818 A1 | 8/2015 | Fukuyama | |
| 2015/0312505 A1 | 10/2015 | Sugawara | |
| 2015/0370526 A1 | 12/2015 | Inagaki | |
| 2016/0100127 A1 | 4/2016 | Choi | |
| 2016/0127704 A1 | 5/2016 | Ouchi | |
| 2017/0079741 A1* | 3/2017 | Makinouchi | A61B 90/36 |

FOREIGN PATENT DOCUMENTS

| | | |
|---|---|---|
| JP | 2006-014356 A | 1/2006 |
| JP | 2008109337 A | 5/2008 |
| JP | 2010128102 A | 6/2010 |
| JP | 2010136105 A | 6/2010 |
| JP | 2011-211693 A | 10/2011 |
| JP | 2011222172 A | 11/2011 |
| JP | 2012-018214 A | 1/2012 |
| JP | 2012205168 A | 10/2012 |
| WO | 2013057714 A1 | 4/2013 |

* cited by examiner

DISPLAY CONTROL APPARATUS, METHOD OF CONTROLLING THE SAME, AND NON-TRANSITORY COMPUTER-READABLE STORAGE MEDIUM

CROSS REFERENCE TO RELATED APPLICATIONS

This application is a continuation of U.S. patent application Ser. No. 14/923,657, filed on Oct. 27, 2015, which claims the benefit of and priority to Japanese Patent Application No. 2014-221961, filed on Oct. 30, 2014, the disclosures of each of which are hereby incorporated by reference herein in their entirety.

BACKGROUND OF THE INVENTION

Field of the Invention

The present invention relates to a display control apparatus, a method of controlling the same, and a non-transitory computer-readable storage medium and, more particularly, to a technique for automatic adjustment for a projection system.

Description of the Related Art

Recently, for example, in amusement facilities, museum exhibition, and the like, projection systems each using one or a plurality of projection apparatuses are permanently installed. One challenge in such a permanently installed projection system is to maintain setup adjustment in a projection apparatus. When the projection system is continuously used for a long period of time, the position and orientation of the apparatus gradually change. For this reason, it is necessary to periodically adjust the distortion of an image caused by fluctuations in positional relationship with the screen of a projection apparatus and discontinuity of images accompanying the relative displacement between a plurality of projection apparatuses. In a projection system using a plurality of projection apparatuses, in particular, much expert knowledge and effort are required to manually perform such setup adjustment. Under the circumstance, there is known a technique of shooting an adjustment pattern projected from the projection apparatus by using a camera, generating adjustment parameters, and correcting a projected shape on a screen (Japanese Patent Laid-Open No. 2006-014356).

In the arrangement disclosed in Japanese Patent Laid-Open No. 2006-014356, however, in order to project an adjustment pattern for automatic adjustment, it is necessary to put the projection system offline. That is, it is necessary to interrupt image projection during adjustment. For this problem, there is known a technique of projecting an adjustment pattern with nonvisible light (infrared light or the like) (Japanese Patent Laid-Open Nos. 2011-211693 and 2012-018214).

SUMMARY OF THE INVENTION

According to the arrangements disclosed in Japanese Patent Laid-Open Nos. 2011-211693 and 2012-018214, since an adjustment pattern is projected with nonvisible light, it is possible to perform automatic adjustment without offlining a projection system. This system, however, additionally requires an arrangement for projection and detection of a nonvisible light adjustment pattern.

The present invention has been made in consideration of the above problem, and provides a technique capable of adjusting a projection system by using visible light while continuing image projection.

According to one aspect of the present invention, a display control apparatus which projects and displays at least one image on a screen, the apparatus includes: a conversion unit adapted to convert a frame frequency for a display of the at least one image to N times (N>1); a generation unit adapted to generate an added image by adding a predetermined pattern to the converted frame and generate a subtracted image by subtracting the predetermined pattern from the converted frame as a first frame and a second frame following the first frame; a control unit adapted to project the first frame and the second frame generated by the generation unit for an image on the screen at the N-times frequency; an acquisition unit adapted to acquire the image projected on the screen; an extraction unit adapted to extract the pattern from the image acquired by the acquisition unit; and a correction unit adapted to correct a shape of the image based on the pattern extracted by the extraction unit.

According to another aspect of the present invention, a method of controlling a display control apparatus which projects and displays at least one image on a screen, the method includes: a conversion step of causing a conversion unit to convert a frame frequency for a display of the at least one image to N times (N>1); a generation step of causing a generation unit to generate an added image by adding a predetermined pattern to the converted image and generate a subtracted image by subtracting the predetermined pattern from the converted frame as a first frame and a second frame following the first frame; a control step of causing a control unit to project the first frame and the second frame generated in the generation step for an image on the screen at the N-times frequency; an acquisition step of causing an acquisition unit to acquire the image projected on the screen; an extraction step of causing an extraction unit to extract the pattern from the image acquired in the acquisition step; and a correction step of causing a correction unit to correct a shape of the image based on the pattern extracted in the extraction step.

Further features of the present invention will become apparent from the following description of exemplary embodiments (with reference to the attached drawings).

DESCRIPTION OF THE EMBODIMENTS

The embodiments of the present invention will be described in detail below with reference to the accompanying drawings.

(Projection Type Image Display Apparatus)

Figure 1:
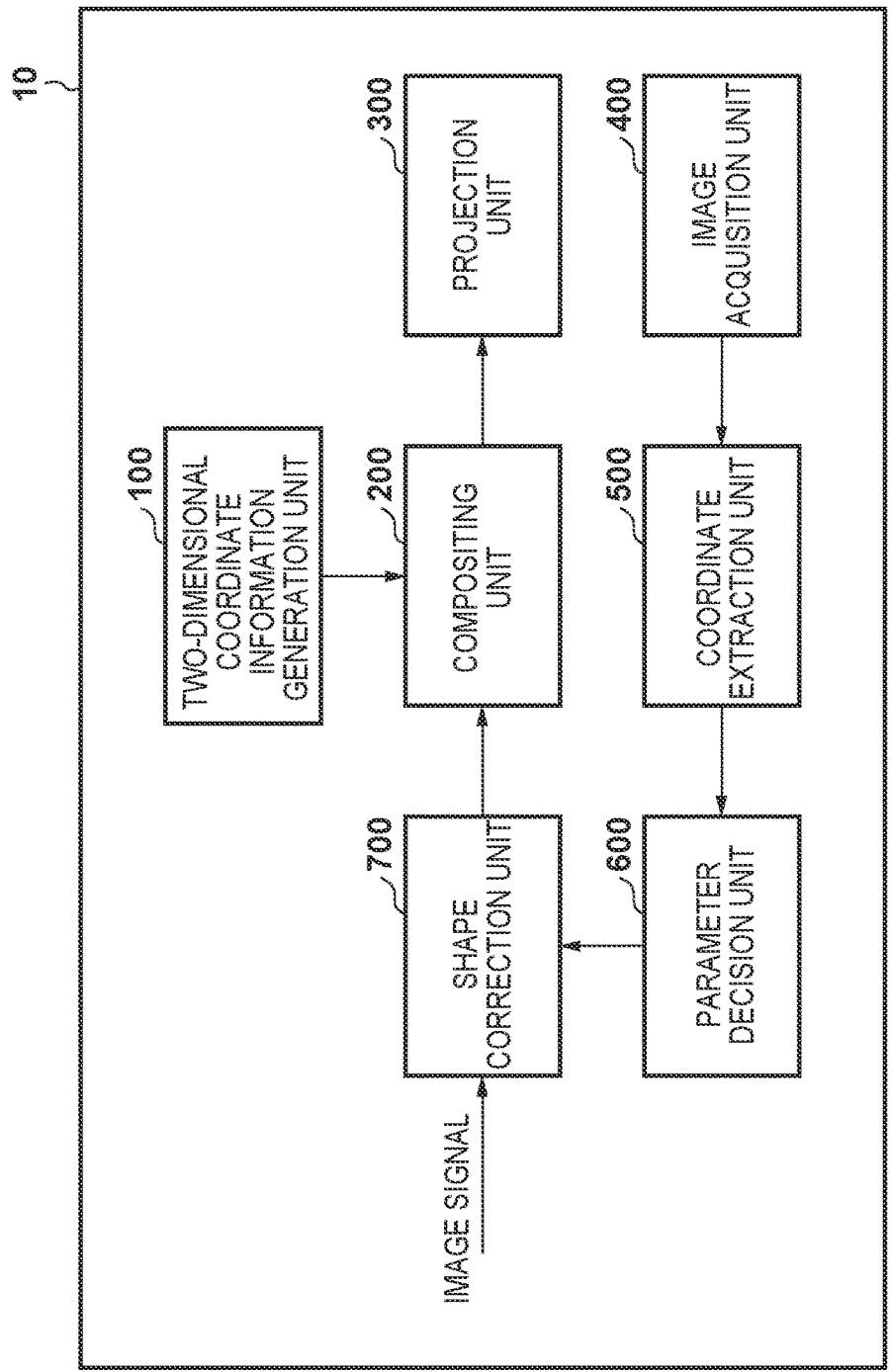
FIG. 1 is a block diagram showing an example of the functional arrangement of a projection type image display apparatus.

FIG. 1 is a block diagram showing an example of the functional arrangement of a projection type image display apparatus (display apparatus) according to an embodiment of the present invention. This arrangement includes a projection type image display apparatus 10, a two-dimensional coordinate information generation unit 100, a compositing unit 200, a projection unit 300, an image acquisition unit 400, a coordinate extraction unit 500, a parameter decision unit 600, and a shape correction unit 700.

The two-dimensional coordinate information generation unit 100 generates a pattern by encoding the two-dimensional coordinates (positions) of predetermined pixels, contained in an image, on the image. That is, this pattern is obtained by encoding predetermined coordinates on a display target image and expressed as an image. The compositing unit 200 generates a projected image by compositing the pattern generated by the two-dimensional coordinate information generation unit 100 with an image. In this case, "compositing" is adding or subtracting a pattern to or from an image. The projection unit 300 projects the projected image displayed on a display panel (not shown) onto a screen (not shown) via a projection lens. In this case, the screen includes any objects on which images can be projected and displayed, such as screens dedicated to projection, buildings, sculptures, and natural objects.

The image acquisition unit 400 is a constituent element which acquires projected image information. For example, the image acquisition unit 400 can be configured to include an image capturing unit (camera) and acquire image information captured by the image capturing unit (camera). The coordinate extraction unit 500 extracts a pattern from the projected image acquired by the image acquisition unit 400, and extracts coordinate information by further decoding the extracted pattern.

The parameter decision unit 600 decides parameters for correcting the shape of an image by, for example, a known technique using the coordinate information extracted by the coordinate extraction unit 500. The shape correction unit 700 generates a projected image by correcting the shape of the image based on the parameters decided by the parameter decision unit 600.

Note that each of the constituent elements described above is formed from dedicated hardware. However, constituent elements other than the projection unit 300 of the projection type image display apparatus 10 may be implemented by making a CPU (Central Processing Unit) (not shown) perform computations using a RAM (Random Access Memory) based on computer programs.

(Adjustment Processing)

Figure 2:
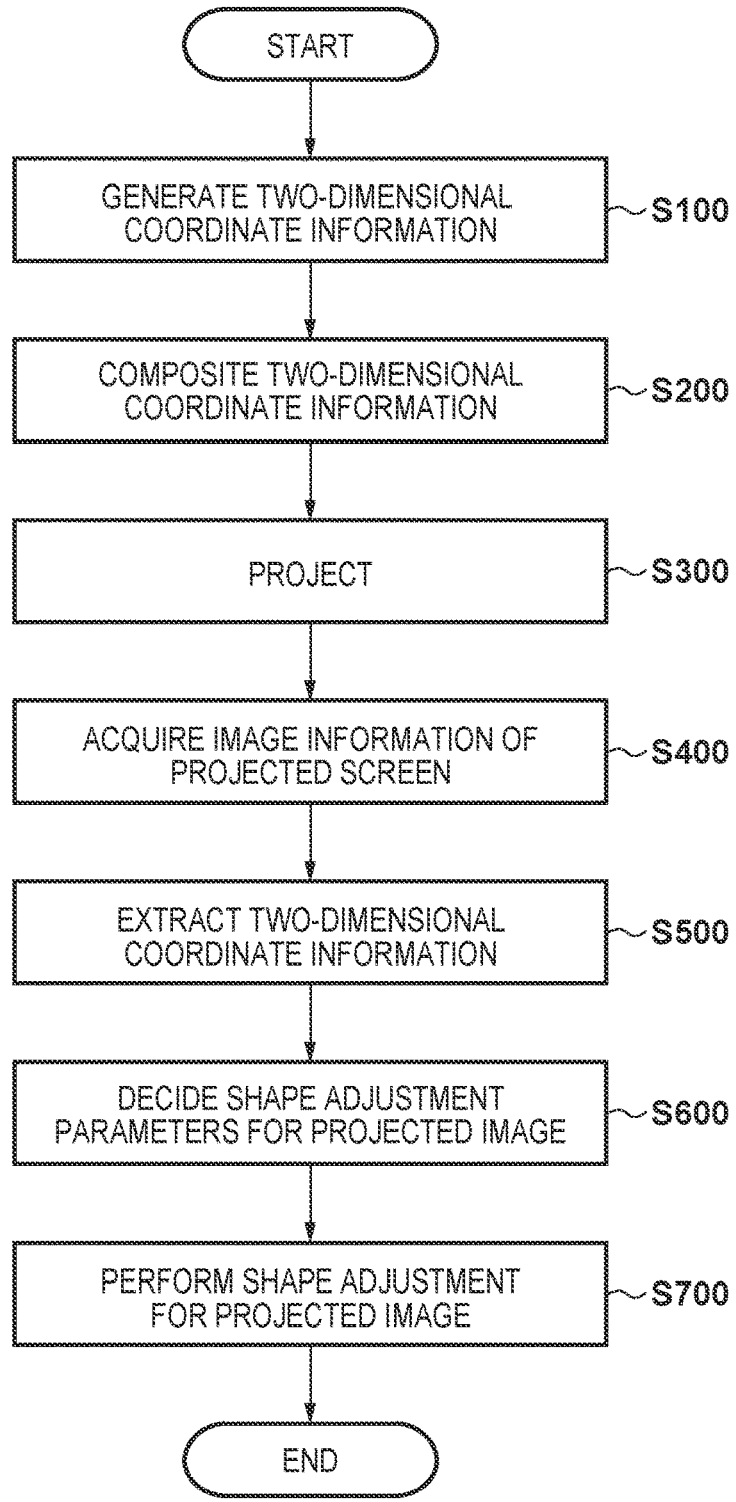
FIG. 2 is a flowchart showing a processing procedure for adjustment processing.
Figure 3:
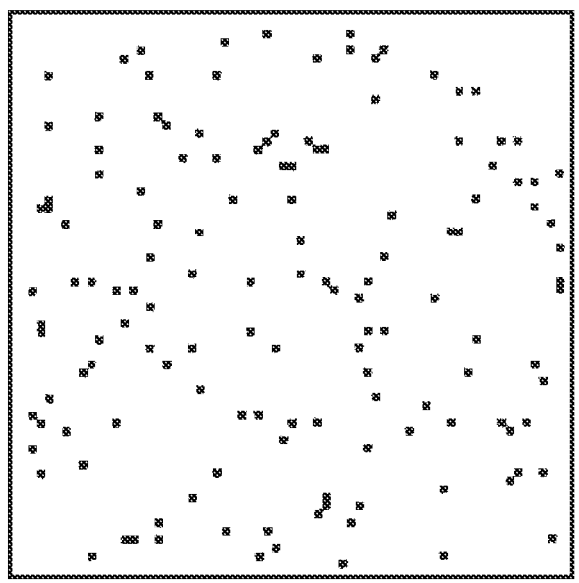
FIG. 3 is a view for explaining an encoded pattern of two-dimensional coordinates.

FIG. 2 is a flowchart showing a processing procedure for adjustment processing executed by the projection type image display apparatus according to this embodiment. First of all, in step S100, the two-dimensional coordinate information generation unit 100 generates a pattern by encoding two-dimensional coordinates (positions) of pixels, contained in an image, on the image. For example, when two-dimensional coordinates (positions) are encoded by using the technique disclosed in U.S. Pat. No. 7,907,795, the obtained encoded pattern becomes a dot pattern like that shown in FIG. 3. The group of dots shown in FIG. 3 is obtained by encoding the two-dimensional coordinates of predetermined pixels on the image. It is possible to determine the distortion of a displayed image from the correspondence between the coordinates obtained by decoding the dot pattern projected on the screen and the coordinates encoded on the displayed image.

Subsequently, the process advances to step S200, in which the compositing unit 200 generates a projected image by compositing the dot pattern generated in step S100 with the image.

The process advances to step S300, in which the projection unit 300 projects the projected image on a projection plane. In this case, it is possible to control the size, density, and concentration of the dot pattern generated in step S100. It is possible to make the dot pattern impossible or very difficult to be observed by the naked eye by setting the size, density, and concentration to small values in consideration of tradeoff with dot pattern extraction accuracy.

In step S400, the image acquisition unit 400 acquires image information obtained by shooting the projection plane (screen) with the camera. The process advances to step S500, in which the coordinate extraction unit 500 extracts a dot pattern from the image information acquired in step S400. For example, a dot pattern can be extracted based on differences from the original image with which the dot pattern is not composited. In addition, the extracted dot pattern is decoded to extract coordinate information. The coordinates on the display panel of the projected image display apparatus are associated with the coordinates on the projection plane (the coordinates on the captured screen) based on the extracted coordinate information.

In step S600, the parameter decision unit 600 decides parameters for correcting the shape of the image by a known technique using the coordinate information extracted in step S500. If, for example, the coordinate information is coordinates forming a mesh, a homography matrix is obtained by using the four vertices of each rectangle region of the mesh, and parameters for shape correction are decided by using the homography matrix.

In step S700, the shape correction unit 700 generates a projected image by correcting the shape of the image based on the parameters decided in step S600.

As described above, predetermined two-dimensional coordinates on a display target image are encoded to display the resultant data as a dot pattern, and the dot pattern is composited with the display target image, thereby adding information which can be used for automatic adjustment for the projected image in an almost nonvisible state to the image. It is possible to continue display while keeping quality without stopping the operation of the projection type image display apparatus by executing automatic adjustment using this nonvisible information at predetermined time intervals.

Figure 4:
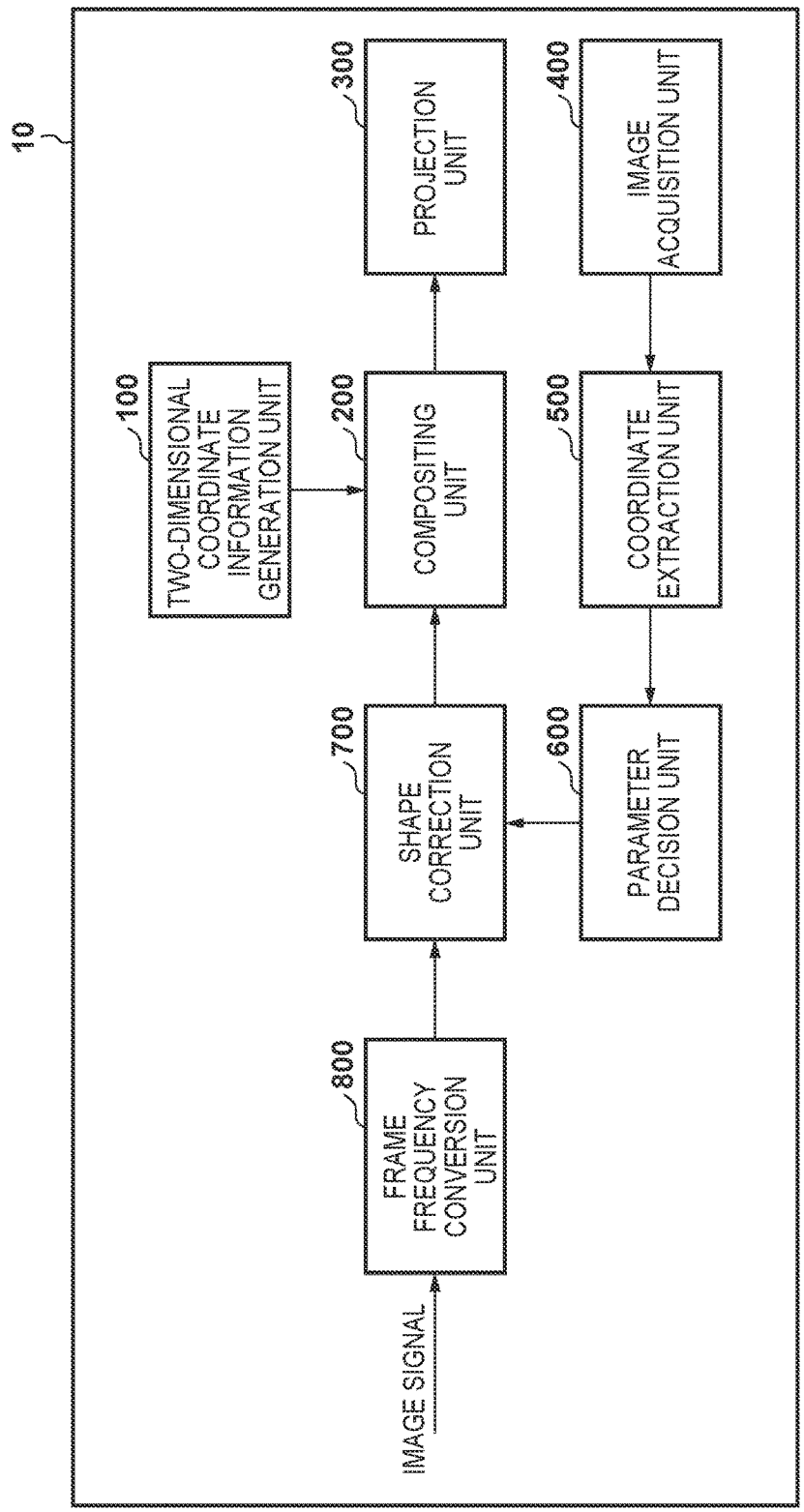
FIG. 4 is a block diagram showing an example of the functional arrangement of a projection type image display apparatus.

FIG. 4 is a block diagram showing an example of the functional arrangement of a projection type image display apparatus according to another embodiment of the present invention. The same reference numerals as in the above arrangement denote the same constituent elements included in this arrangement. As shown in FIG. 4, a projection type image display apparatus 10 includes a frame frequency conversion unit 800.

The frame frequency conversion unit 800 converts the frame frequency of an image signal to a frequency that makes flicker less perceptible with respect to a luminance change according to human visual characteristics by resizing the frame frequency to N times (N>1). Such frequencies are generally 70 Hz or higher, at which no flicker is perceived. If, therefore, the frame frequency of an image signal is 60 Hz, the frame frequency is converted to 120 Hz. A case in which N=2 will be described below. In this case, assume that if frame images are represented by A•B•C . . . in the case of a frame frequency of 60 Hz, frame images are represented by A•A•B•B•C•C . . . in the case of a frame frequency of 120 Hz. In general, when a frame frequency is resized to N times, the frames of the same image are sequentially displayed N images at a time.

In this embodiment, a compositing unit 200 adds or subtracts the dot pattern generated by a two-dimensional coordinate information generation unit 100 to or from the image signal having undergone frame frequency conversion in synchronism with the frame frequency having undergone frequency conversion. If N=2 as in the above case, a dot pattern is added to one of consecutive frames, and the same dot pattern is subtracted from the other frame. If the converted frame frequency is twice or more than the original frequency (N>2), the addition and subtraction of a dot pattern to and from an image each are performed for at least one frame. Dot pattern addition/subtraction is performed with respect to a plurality of frames such that the number of times of addition is equal to that of subtraction at frame intervals at which the human can recognize flicker.

Dot patterns visually cancel each other and can be made nonvisible by adding and subtracting the dot pattern to and from frame images converted to a frequency that makes flicker less perceptible with respect to a luminance change according to human visual characteristics. In addition, since a dot pattern can be extracted from the difference between frame images to and from which a dot pattern is added and subtracted, the dot pattern can be detected with a density substantially twice that in the above embodiment. Therefore, this embodiment can further improve the dot pattern extraction accuracy. Note that in the embodiment, a pattern is displayed by visible light so as not to be perceived by the naked eye by projecting an added image obtained by adding the pattern to a display target image and a subtracted image obtained by subtracting the pattern from the image while switching them at a frequency higher than that allows human perception. For this reason, a pattern to be composited with a display target image is not limited to the pattern obtained by encoding predetermined coordinates on the display target image, and any predetermined pattern can be used.

In addition, dot pattern addition/subtraction with respect to a frame image needs to be performed with a luminance-linear tone. In general, an image signal has undergone tone processing in consideration of the gamma characteristics of a display device. For this reason, if the image signal input to the compositing unit 200 does not have a luminance-linear tone, gamma/de-gamma processing is performed before and after the compositing unit 200 to make the signal have a luminance-linear tone.

This embodiment has exemplified the case in which a frame frequency is converted to twice itself (N=2). However, this is not exhaustive. In addition, FIG. 4 shows an example of the arrangement in which the frame frequency conversion unit 800 is arranged before a shape correction unit 700. However, this is not exhaustive. The frame frequency conversion unit 800 may be arranged after the shape correction unit 700.

Note that when converting a frame frequency, this arrangement may have a mode of generating high-frequency image frames and low-frequency image frames from target image frames instead of generating N identical image frames. In this case, when compositing a dot pattern with an image, the arrangement may be configured to switch to the mode of generating N identical image frames.

As described above, it is possible to make two-dimensional coordinate information nonvisible by converting a frame frequency to a frequency that makes flicker less perceptible with respect to a luminance change according to human visual characteristics and compositing a dot pattern by addition/subtraction. Using this nonvisible information for automatic adjustment can continue display while keeping quality without stopping the operation of the projection type image display apparatus. That is, the frame frequency of a moving image is converted to N times itself, and the first and second frames are respectively formed into an added image and a subtracted image, thus projecting the moving image including the added image and the subtracted image on the screen at a frame frequency N times that of the input moving image. According to this embodiment, therefore, since the luminances and the like of the added image and the subtracted image are averaged, it is possible to generate and use a pattern which cannot be observed by the naked eye even by using visible light.

Note that this embodiment has exemplified the case in which a moving image is displayed. However, a similar technique can be used when displaying a still image. That is, an added image obtained by the addition of a dot pattern and a subtracted image obtained by the subtraction of the dot pattern can be generated from one still image, and the generated images are displayed while being switched at a frequency higher than that allows human perception. This makes it possible to generate a pattern which cannot be observed by the naked eye by using visible light and to use the pattern for adjustment for a projection apparatus.

The functional arrangement of a projection type image display apparatus according to still another embodiment of the present invention is the same as that of the projection type image display apparatus according to the above embodiment shown in FIG. 4 unless otherwise specified. In the above embodiment, tone level overflows or underflows are caused by addition/subtraction of a dot pattern to/from a frame image depending on the tone level of the frame image. When such overflows or underflows have occurred, a balance for the cancellation of a dot pattern deteriorates, resulting in the displacement of the display tone of the original image. For this reason, the human may perceive such overflows or underflows as flicker and recognize a deterioration in image quality. In this embodiment, when tone level overflows or underflows are detected, the quality of the image is maintained by compensating for the overflows or underflows.

Figure 5:
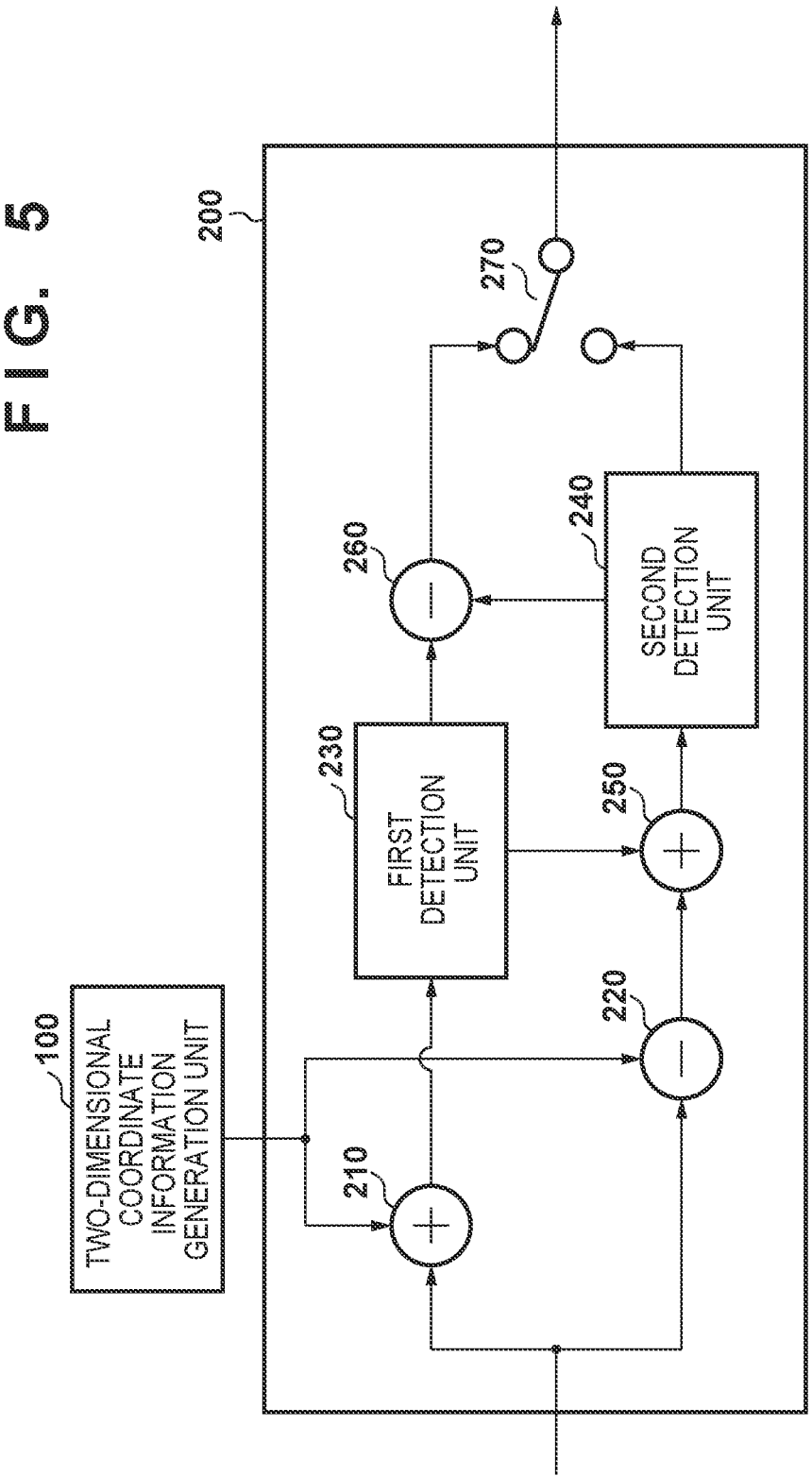
FIG. 5 is a block diagram showing an example of the functional arrangement of a compositing unit.

FIG. 5 is a block diagram showing an example of the functional arrangement of a compositing unit 200 in this embodiment for solving a problem in terms of tone level overflows or underflows. Referring to FIG. 5, this arrangement includes a first adder 210, a first subtracter 220, a first detection unit 230, a second detection unit 240, a second adder 250, a second subtracter 260, and a switch 270.

The first adder 210 and the first subtracter 220 each add/subtract the dot pattern generated by a two-dimensional coordinate information generation unit 100 to/from an image having undergone frame frequency conversion. The first detection unit 230 detects whether tone level overflows have occurred on the added image obtained by dot pattern addition by the first adder 210. The second detection unit 240 detects whether tone level underflows have occurred on the subtracted image obtained by dot pattern subtraction by the first subtracter 220. Note that the placement order of the first detection unit 230 and the second detection unit 240 shown in FIG. 5 may be reversed.

The second adder 250 functions as the first compensation unit which compensates for the tone level overflows caused by dot pattern addition by the first adder 210. The second subtracter 260 functions as the second compensation unit which compensates for the tone level underflows caused by dot pattern subtraction by the first subtracter 220. The switch 270 alternately selects and outputs the results obtained by dot pattern addition/subtraction with respect to the image input from a shape correction unit 700 in synchronism with a frame frequency having undergone frequency conversion.

(Compositing Processing)

Figure 6:
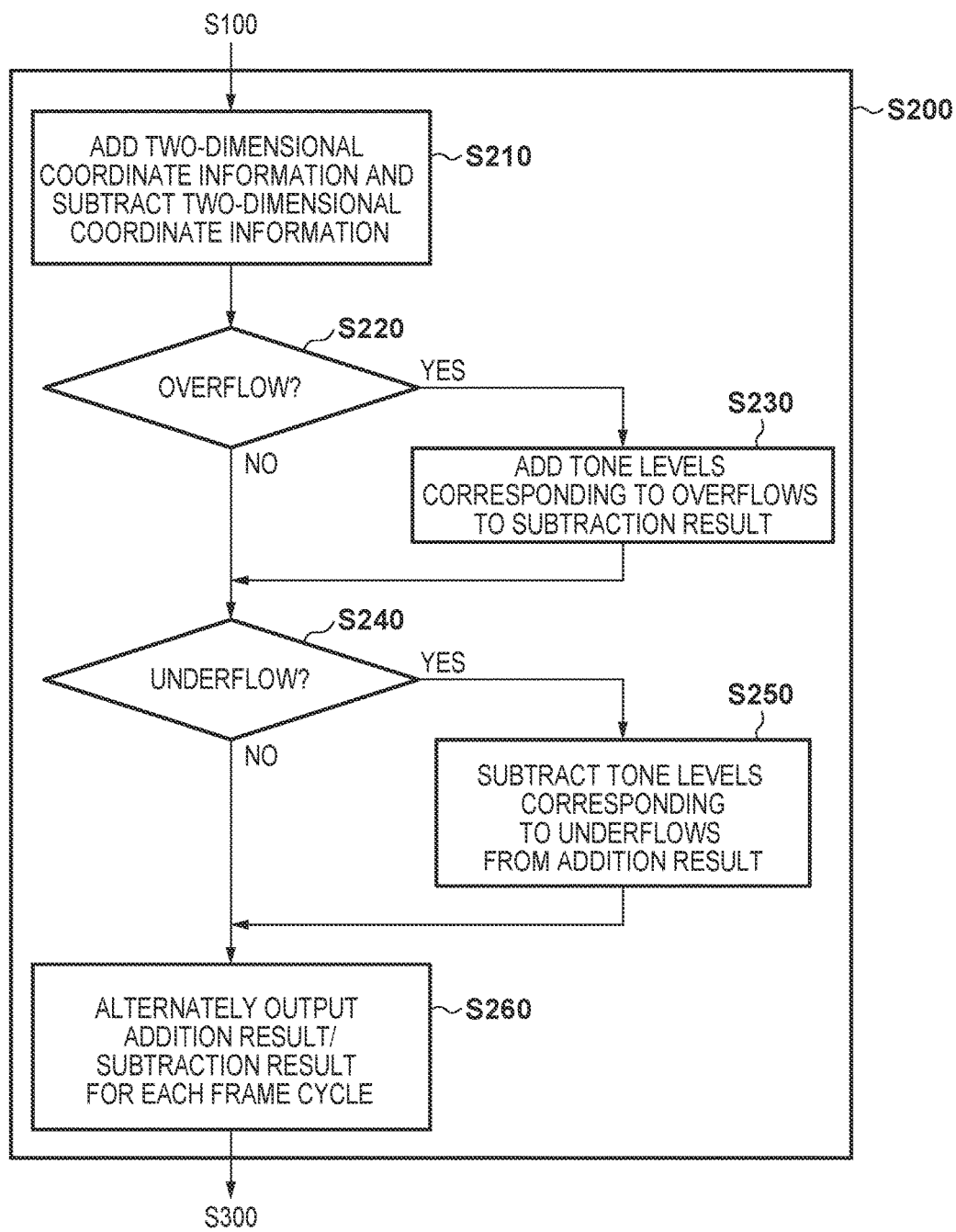
FIG. 6 is a flowchart for a processing procedure for compositing processing.

FIG. 6 is a flowchart showing a processing procedure for compositing processing executed by the compositing unit 200 according to this embodiment. The overall processing procedure in FIG. 6 corresponds to step S200 in FIG. 2.

Figure 7A:
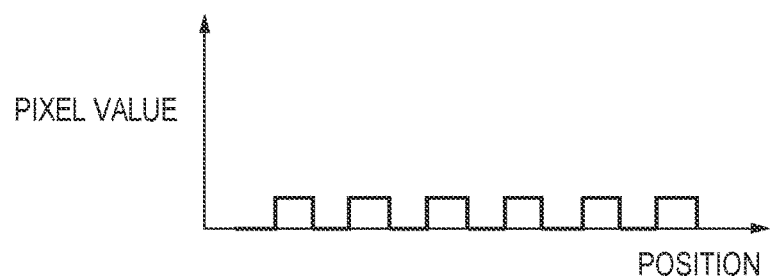
FIGS. 7A, 7B, 7C, 7D, 7E, 7F, 7G, and 7H are graphs for explaining tone compensation processing.
Figure 7B:
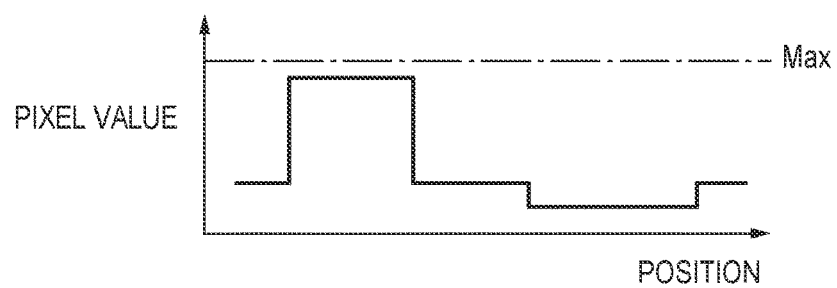
Figure 7C:
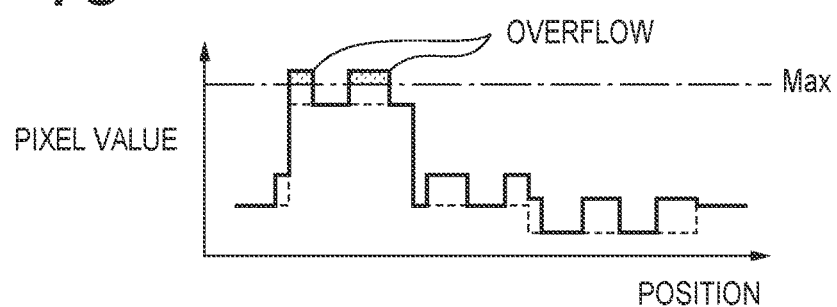
Figure 7D:
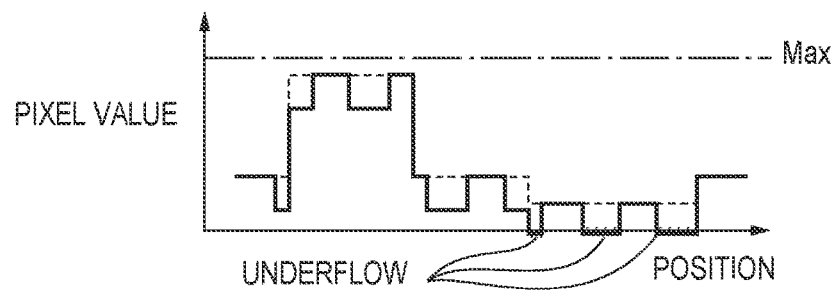

First of all, in step S210, images are respectively generated by adding the dot pattern generated by the two-dimensional coordinate information generation unit 100 to the image and subtracting the dot pattern from the image. The first adder 210 performs dot pattern addition. The first subtracter 220 performs dot pattern subtraction. FIGS. 7A, 7B, 7C, 7D, 7E, 7F, 7G, and 7H are graphs for explaining tone correction processing by the compositing unit. FIGS. 7A, 7B, 7C, 7D, 7E, 7F, 7G, and 7H each one-dimensionally show pixel values on a given row or column of an image. The abscissa represents the positions of pixels, and the ordinate represents pixel values. FIG. 7A shows the dot pattern generated by the two-dimensional coordinate information generation unit 100. FIG. 7B shows the image input to the compositing unit 200. FIG. 7C shows the image (added image) obtained by adding the dot pattern to the input image. FIG. 7D shows the image (subtracted image) obtained by subtracting the dot pattern from the input image.

In step S220, the first detection unit 230 determines whether tone overflows have occurred on the image obtained by dot pattern addition by the first adder 210. If overflows have occurred (YES in step S220), the process advances to step S230. If no overflow has occurred (NO in step S220), the process directly advances to step S240.

Figure 7E:
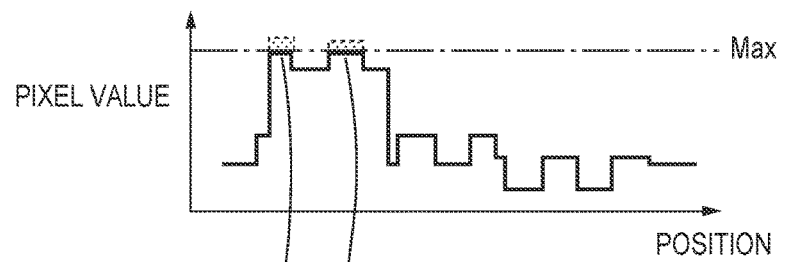
Figure 7F:
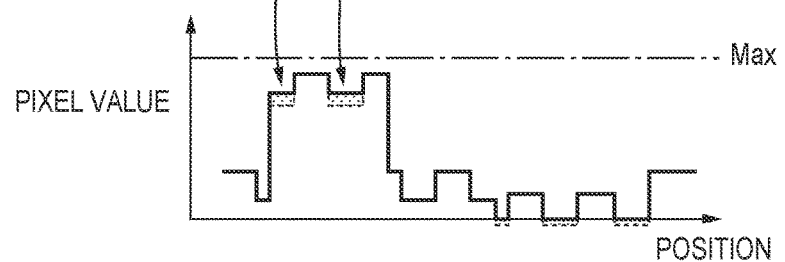

In step S230, the second adder 250 compensates for the overflows by adding tone levels corresponding to the overflows to the image obtained by dot pattern subtraction by the first subtracter 220. FIGS. 7E and 7F schematically show overflow tone compensation in step S230. Like FIG. 7C, FIG. 7E shows the added image output from the first adder 210 except that the overflows indicated by the hatched portions are cut. In step S230, the second adder 250 adds tone levels corresponding to these overflows to the subtracted image (FIG. 7D) output from the first subtracter 220. FIG. 7F shows the result obtained by adding the tone levels (hatched portions) corresponding to the overflows to the subtracted image output from the first subtracter 220. In this manner, it is possible to suppress the occurrence of flicker by adding the magnitudes (saturated portions) of the pixel values cut from the added image because of the overflows to the subtracted image and maintaining the average values of the pixel values of the added image and the subtracted image to the pixel values of the input image. In step S230, when the overflow compensation is complete, the process advances to step S240.

In step S240, the second detection unit 240 determines whether tone underflows have occurred on the image obtained by dot pattern subtraction by the first subtracter 220 and overflow compensation performed by the second adder 250 as needed. If underflows have occurred (YES in step S240), the process advances to step S250. If no underflow has occurred (NO in step S240), the process directly advances to step S260.

Figure 7G:
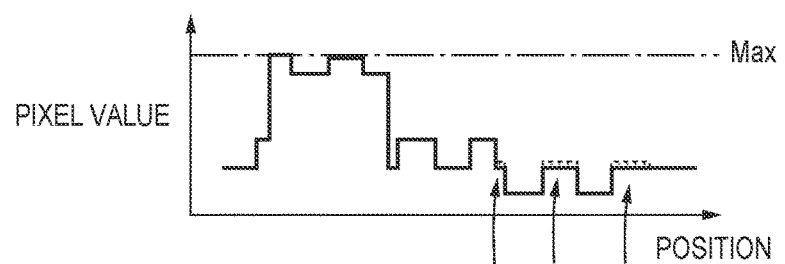
Figure 7H:
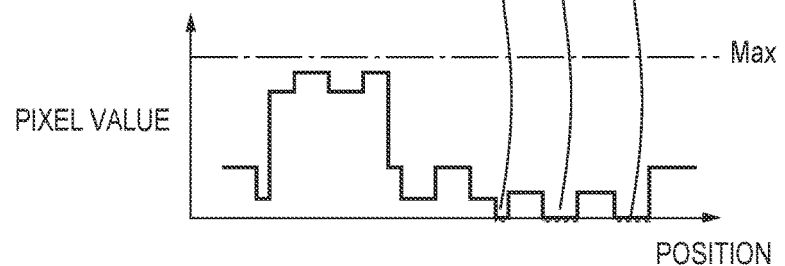

In step S250, the second subtracter 260 compensates for the underflows by subtracting tone levels corresponding to the underflows from the image obtained by dot pattern addition by the first adder 210. FIGS. 7G and 7H schematically show underflow tone compensation in step S250. FIG. 7H shows the image obtained by compensating for the overflows with respect to the subtracted image output from the first subtracter 220 as needed, from which tone levels corresponding to the underflows are cut. In step S250, the second subtracter 260 subtracts tone levels corresponding to these underflows from the added image (FIG. 7E). FIG. 7G shows the result obtained by subtracting the tone levels (hatched portions) corresponding to the underflows from the added image. In this manner, it is possible to suppress the occurrence of flicker by subtracting the magnitudes of the pixel values cut from the subtracted image because of the underflows from the added image and maintaining the average values of the pixel values of the added image and the subtracted image to the pixel values of the input image. In step S250, when the underflow compensation is complete, the process advances to step S260.

In step S260, the images obtained by dot pattern addition and dot pattern subtraction are alternatively output for each frame cycle resized to N times. The process then advances to step S300 in FIG. 2.

As described above, it is possible to suppress flicker and reliably guarantee nonvisibility by compensating for tone overflows/underflows caused by dot pattern addition/subtraction and making the average values of the pixel values of an added image and a subtracted image equal to the pixel values of an input image. Using this nonvisible information for automatic adjustment makes it possible to continue display while keeping quality without stopping the operation of the projection type image display apparatus.

Figure 8:
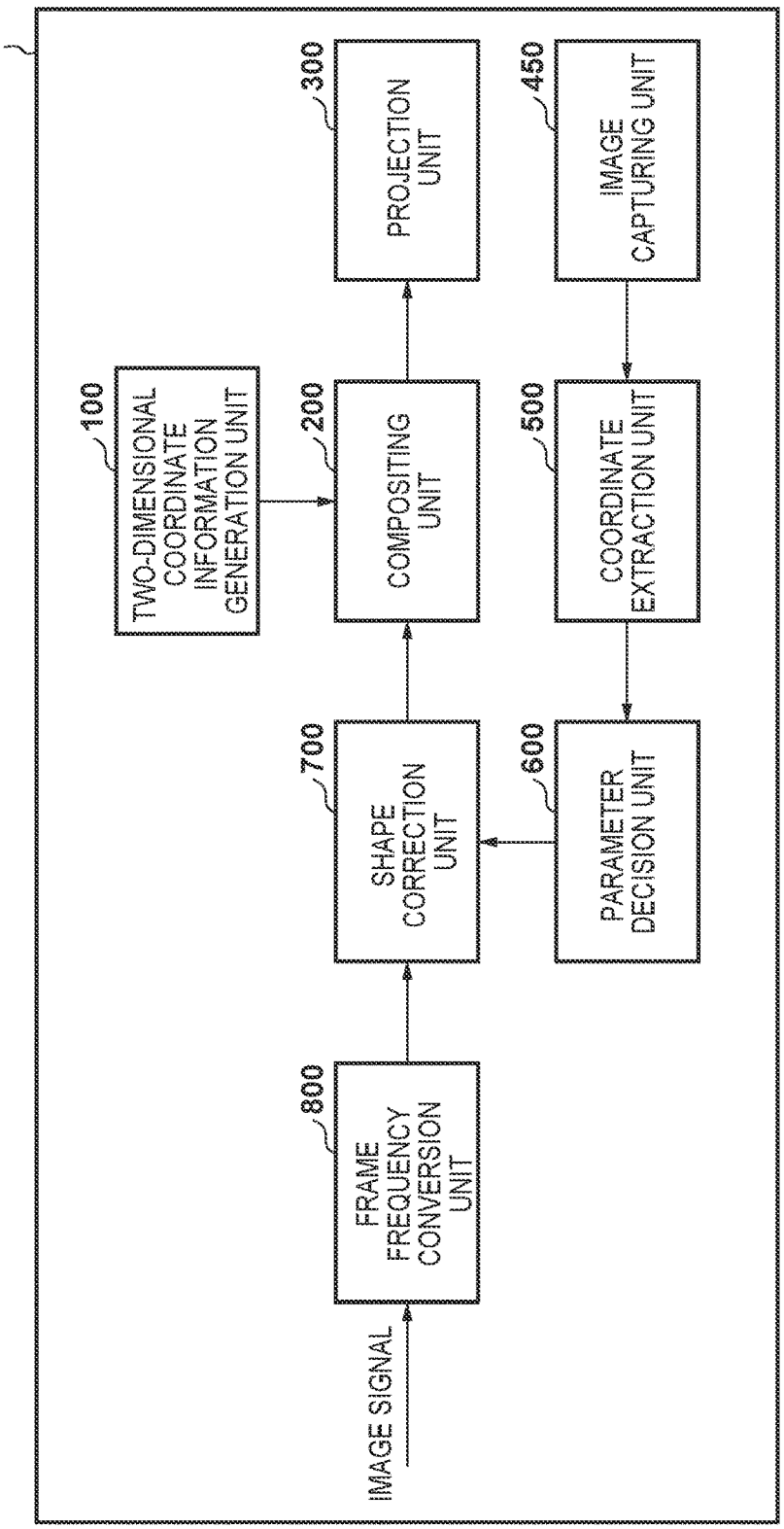
FIG. 8 is a block diagram showing an example of the functional arrangement of a projection type image display apparatus.

FIG. 8 is a block diagram showing an example of the functional arrangement of a projection type image display apparatus according to yet another embodiment of the present invention. The arrangement in FIG. 8 is the same as that in the above embodiment, unless otherwise specified, except that the image acquisition unit 400 is replaced by an image capturing unit 450 in the second embodiment described with reference to FIG. 4.

The image capturing unit 450 is a constituent element which acquires an image by converting the optical signal input via an optical system into electric charges, and is implemented by a still or moving image camera. The projection type image display apparatus according to this embodiment incorporates the image capturing unit 450, and can automatically perform adjustment by acquiring the image projected on the screen by image capturing without requiring other external devices. That is, incorporating the image capturing unit allows the projection type image display apparatus by itself to perform automatic adjustment using nonvisible information.

Figure 9:
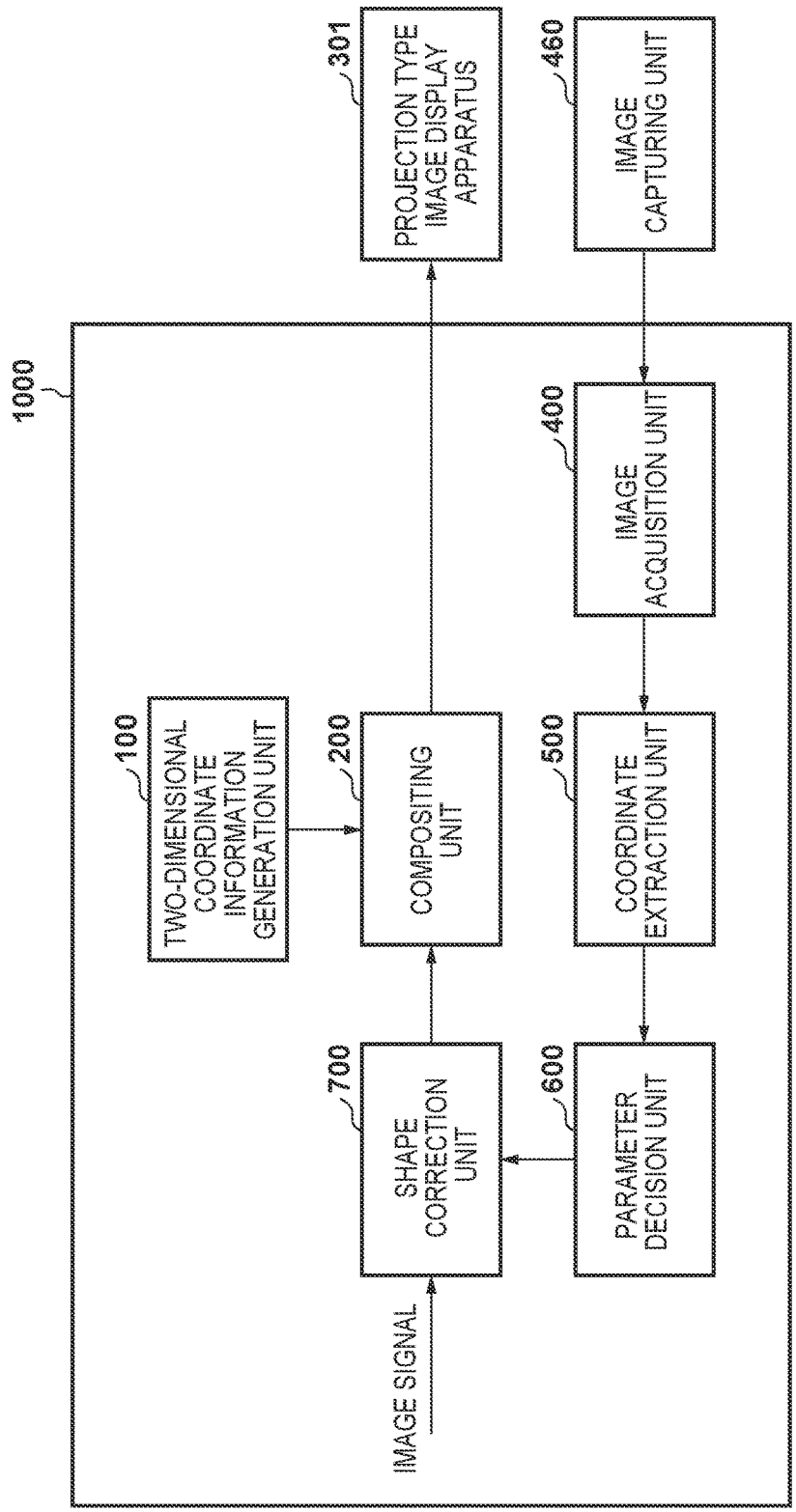
FIG. 9 is a block diagram showing an example of the functional arrangement of a projection type image display system.

FIG. 9 is a block diagram showing an example of the functional arrangement of a projection type image display system according to still yet another embodiment of the present invention. This arrangement includes an image processing apparatus 1000, a two-dimensional coordinate information generation unit 100, a compositing unit 200, a projection type image display apparatus 301, an image acquisition unit 400, an image capturing unit 460, a coordinate extraction unit 500, a parameter decision unit 600, and a shape correction unit 700. The constituent elements denoted by the same reference numerals as in FIGS. 1 and 4 have the same functions as those in the projection type image display apparatus according to the above embodiment unless otherwise specified.

In this embodiment, the image processing apparatus 1000 performs the series of processing of adding nonvisible information which can be used for automatic adjustment, extracting coordinate information from a projected image, and performing shape correction. The projection type image display apparatus 301 only projects the projected image generated by the image processing apparatus 1000. The respective constituent elements of the image processing apparatus 1000 are implemented by making a CPU in a general-purpose information processing apparatus such as a PC (Personal Computer) or tablet terminal execute computer programs. In addition, the projection type image display apparatus 301 can be implemented by an information processing apparatus and a general-purpose projector apparatus capable of communication. The image capturing unit 460 is implemented by a still or moving image camera like the image capturing unit 450 in FIG. 8 which has been referred to in the above embodiment. Note that the image processing apparatus 1000, the projection type image display apparatus 301, and the image capturing unit 460 are connected to each other via a wired cable or wireless communication such as a wireless LAN or Bluetooth®.

As described above, the projection type image display system according to this embodiment is constituted by general-purpose devices, and can perform automatic adjustment using nonvisible information by using a general-purpose projection type image display apparatus.

Figure 10:
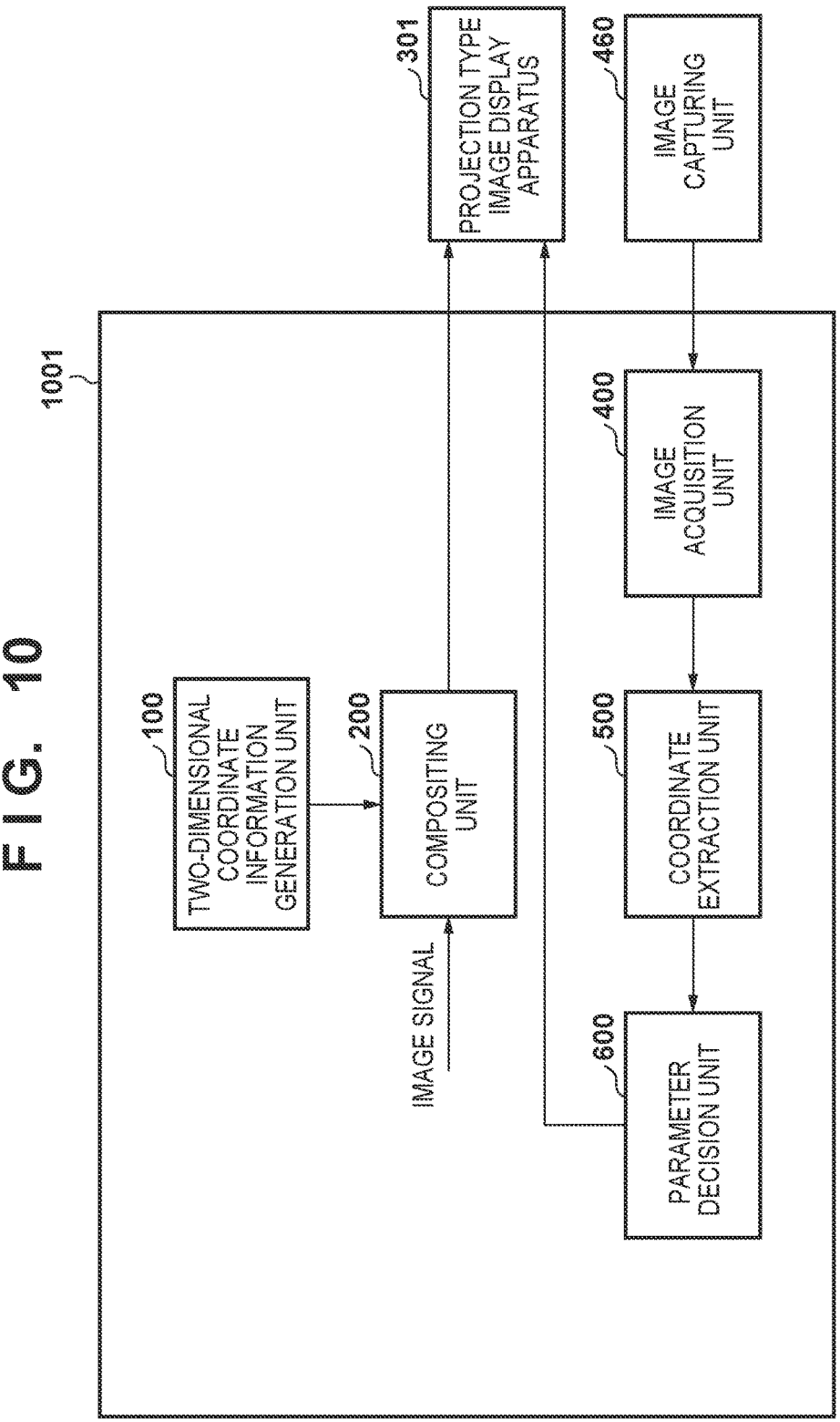
FIG. 10 is a block diagram showing an example of the functional arrangement of a projection type image display system.

FIG. 10 is a block diagram showing an example of the functional arrangement of a projection type image display system according to yet still another of the present invention. This arrangement includes an image processing apparatus 1001, a two-dimensional coordinate information generation unit 100, a compositing unit 200, a projection type image display apparatus 301, an image acquisition unit 400, an image capturing unit 460, a coordinate extraction unit 500, and a parameter decision unit 600. The constituent elements denoted by the same reference numerals as in FIGS. 1, 4, and 9 have the same functions in the arrangement according to the above embodiment unless otherwise specified.

In this embodiment, the image processing apparatus 1001 performs the series of processing of adding nonvisible information which can be used for automatic adjustment, extracting coordinate information from a projected image, and deciding shape correction parameters. The shape correction parameters decided by the parameter decision unit 600 are sent to the projection type image display apparatus 301. A projected shape is corrected by the projected shape correction function of the projection type image display apparatus 301. In this case, the projected shape correction function of the projection type image display apparatus 301 performs projected shape correction with higher image quality than the image processing apparatus 1000 does. In this embodiment, therefore, it is possible to perform automatic adjustment using nonvisible information by high-image-quality projected shape correction by using the function of a general-purpose projection type image display apparatus for only the deformation of a projected shape.

The present invention can provide a technique capable of adjusting a projection system by using visible light while continuing image projection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display control apparatus comprising:
at least one hardware processor; and
a memory which stores instructions executable by the at least one hardware processor to cause the display control apparatus to perform:
increasing pixel values of a plurality of predetermined positions on a first image based on an image frame of an inputted image signal;
decreasing pixel values of the plurality of predetermined positions, which are the same as positions where the pixel values of the first image are increased in the increasing, on a second image based on the image frame;
performing projection control to control a projection unit so that N image frames, which are based on the image frame and include both the first image whose pixel values of the predetermined positions have been increased in the increasing and the second image whose pixel values of the predetermined positions have been decreased in the decreasing, are projected at a frequency that is N-times a frame frequency according to the inputted image signal, wherein N is greater than 1;
acquiring, based on a captured image obtained by a capturing unit for capturing a projection surface where an image is projected according to the projection control, a parameter for adjusting an image to be projected by the projection unit; and performing adjustment processing for adjusting, based on the parameter acquired in the acquiring, the image to be projected on the projection surface by the projection unit.

2. The display control apparatus according to claim 1, wherein the projection unit is controlled by the projection control so that the first image whose pixel values of the predetermined positions have been increased in the increasing and the second image whose pixel values of the predetermined positions have been decreased in the decreasing are successively projected.

3. The display control apparatus according to claim 1, wherein the first image whose pixel values have not been increased in the increasing is the same as the second image whose pixel values have not been decreased in the decreasing.

4. The display control apparatus according to claim 1, wherein
   in the increasing, pixel values of the plurality of predetermined positions on each of one or more images included in the N image frames are increased, and wherein
   in the decreasing, pixel values of the plurality of predetermined positions on each of one or more images included in the N image frames are decreased, and wherein
   a number of increased images whose pixel values are increased in the increasing is the same as a number of decreased images whose pixel values are decreased in the decreasing.

5. The display control apparatus according to claim 1, further performs:
   specifying a plurality of positions in the captured image corresponding to the plurality of predetermined positions, wherein
   in the acquiring, the parameter is acquired based on a result of the specifying the plurality of positions in the captured image.

6. The display control apparatus according to claim 5, wherein
   in the specifying, the plurality of positions is specified based on a difference between a first captured image obtained by capturing the projection surface where an image according to the first image is projected and a second captured image obtained by capturing the projection surface where an image according to the second image is projected.

7. The display control apparatus according to claim 1, wherein the plurality of predetermined positions are set based on encoding coordinate information.

8. The display control apparatus according to claim 1, wherein an amount of increase in the pixel values in the increasing and an amount of decrease in the pixel values in the decreasing are determined based on a characteristic of the projection unit.

9. The display control apparatus according to claim 1, wherein
   in the increasing, an amount of increase in a pixel value of a specific position among the plurality of predetermined positions on the first image is determined so that the amount of increase in a first case where the pixel value of the specific position on the first image exceeds a first threshold is less than the amount of increase in a second case where the pixel value of the specific position on the first image is below the first threshold, and wherein
   in the decreasing, an amount of decrease in a pixel value of the specific position on the second image is determined so that the amount of decrease in the first case is less than the amount of decrease in the second case.

10. The display control apparatus according to claim 1, wherein
    in the decreasing, an amount of decrease in a pixel value of a specific position among the plurality of predetermined positions on the second image is determined so that the amount of decrease in a third case where the pixel value of the specific position on the second image is below a second threshold is less than the amount of decrease in a fourth case where the pixel value of the specific position on the second image exceeds the second threshold, and wherein
    in the increasing, an amount of increase in a pixel value of the specific position on the first image is determined so that the amount of increase in the third case is less than the amount of increase in the fourth case.

11. The display control apparatus according to claim 1, wherein
    the capturing unit is a camera which is capable of communication with the display control apparatus.

12. The display control apparatus according to claim 1, wherein
    the projection unit is a projector apparatus which is capable of communication with the display control apparatus.

13. The display control apparatus according to claim 12, wherein
    in the adjustment processing, the parameter acquired in the acquiring is outputted to the projection unit for adjusting the image to be projected on the projection surface.

14. The display control apparatus according to claim 1, further comprising the capturing unit and the projection unit.

15. The display control apparatus according to claim 1, wherein the first image whose pixel values have not been increased in the increasing is the same as the image frame.

16. A display control method executed by a display system, the method comprising:
    increasing pixel values of a plurality of predetermined positions on a first image based on an image frame of an inputted image signal;
    decreasing pixel values of the plurality of predetermined positions, which are the same as the positions where the pixel values of the first image are increased in the increasing, on a second image based on the image frame;
    performing projection control to control a projection unit so that N image frames, which are based on the image frame and include both the first image whose pixel values of the predetermined positions have been increased in the increasing and the second image whose pixel values of the predetermined positions have been decreased in the decreasing, are projected at a frequency that is N-times a frame frequency according to the inputted image signal, wherein N is greater than 1;
    acquiring, based on a captured image obtained by a capturing unit for capturing a projection surface where an image is projected according to the projection control, a parameter for adjusting an image to be projected by the projection unit; and performing adjustment processing for adjusting, based on the parameter acquired in the acquiring, the image to be projected on the projection surface by the projection unit.

17. The display control method according to claim 16, wherein the projection unit is controlled by the projection control so that the first image whose pixel values of the predetermined positions have been increased in the increasing and the second image whose pixel values of the predetermined positions have been decreased in the decreasing are successively projected.

18. The display control method according to claim 16, wherein the first image whose pixel values have not been increased in the increasing is the same as the second image whose pixel values have not been decreased in the decreasing.

19. A non-transitory computer-readable storage medium which stores a computer program for causing a computer to execute a method of controlling a display control apparatus, the method comprising:

increasing pixel values of a plurality of predetermined positions on a first image based on an image frame of an inputted image signal;

decreasing pixel values of the plurality of predetermined positions, which are the same as the positions where the pixel values of the first image are increased in the increasing, on a second image based on the image frame;

performing projection control to control a projection unit so that N image frames, which are based on the image frame and include both the first image whose pixel values of the predetermined positions have been increased in the increasing and the second image whose pixel values of the predetermined positions have been decreased in the decreasing, are projected at a frequency that is N-times a frame frequency according to the inputted image signal, wherein N is greater than 1;

acquiring, based on a captured image obtained by a capturing unit for capturing a projection surface where an image is projected according to the projection control, a parameter for adjusting an image to be projected by the projection unit; and performing adjustment processing for adjusting, based on the parameter acquired in the acquiring, the image to be projected on the projection surface by the projection unit.

\* \* \* \* \*